Dec. 15, 1925.                                                    1,565,428
              W. C. DIXON
         TEMPERATURE CONTROLLING SYSTEM
              Filed April 7, 1922
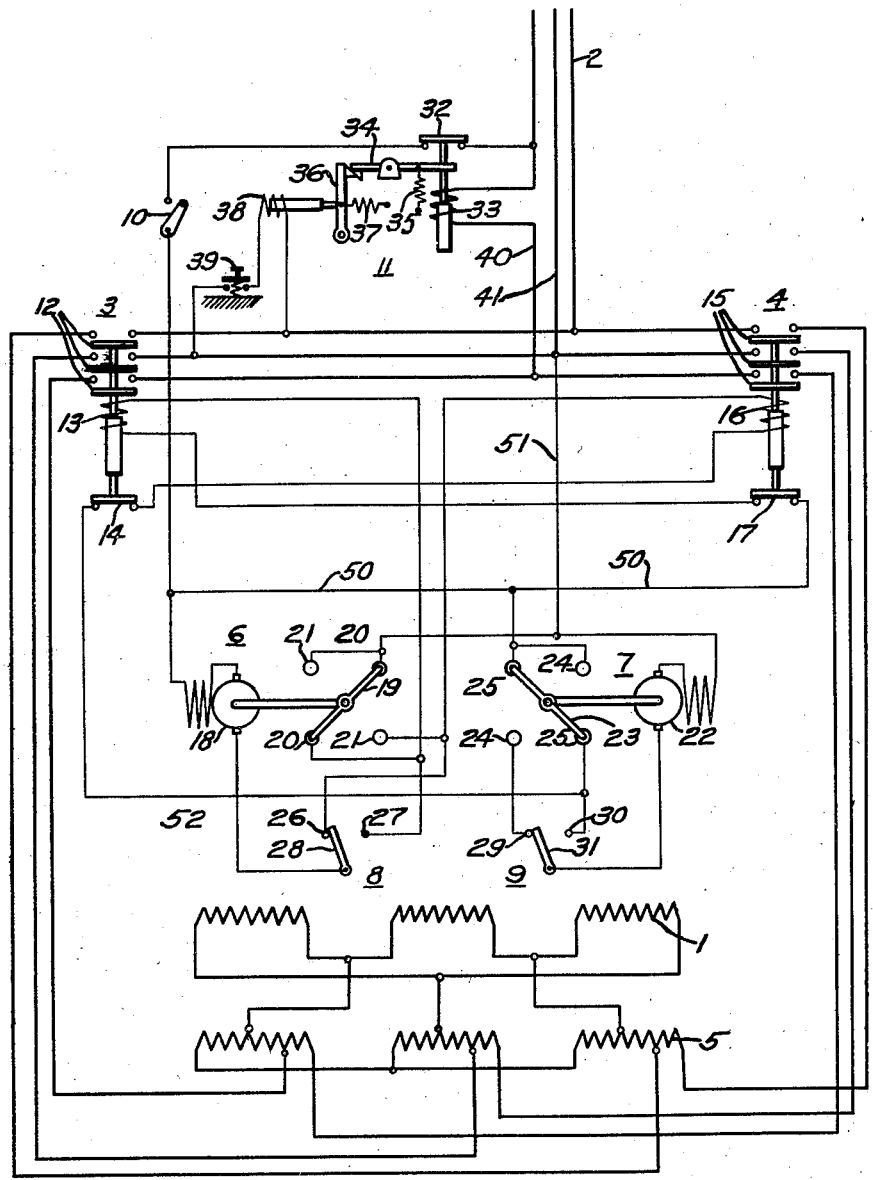
WITNESSES:                                    INVENTOR
R. J. Butler.                              Walter C. Dixon.
J. E. Foster                                     BY
                                           Wesley G. Carr
                                                  ATTORNEY Patented Dec. 15, 1925.

1,565,428

UNITED STATES PATENT OFFICE.

WALTER C. DIXON, OF WILKINSBURG, PENNSYLVANIA, ASSIGNOR TO WESTINGHOUSE ELECTRIC & MANUFACTURING COMPANY, A CORPORATION OF PENNSYLVANIA.

TEMPERATURE-CONTROLLING SYSTEM.

Application filed April 7, 1922. Serial No. 550,526.

*To all whom it may concern:*

Be it known that I, WALTER C. DIXON, a citizen of the United States, and a resident of Wilkinsburg, in the county of Allegheny and State of Pennsylvania, have invented a new and useful Improvement in Temperature-Controlling Systems, of which the following is a specification.

My invention relates to controlling systems and particularly to temperature-controlling systems for electrical heating furnaces.

One object of my invention is to provide a control scheme whereby the heating elements of an electric furnace may be energized to develop a relatively large amount of heat while the temperature of the furnace is within a predetermined range below a predetermined temperature and to develop a smaller amount of heat while the temperature of the furnace is within a second predetermined range above a predetermined temperature.

Another object of my invention is to provide a control system, of the above-indicated character, that shall maintain the temperature of the furnace between predetermined limits.

Another object of my invention is to provide a control system, of the above-indicated character, that shall effect the development of a relatively large amount of heat when the furnace is started from cold condition to develop a predetermined temperature and that shall then effect the development of only sufficient heat to supply the heat losses of the furnace whereby its temperature may be maintained substantially constant.

Another object of my invention is to provide a system, of the above-indicated character, that shall reestablish large heat-developing conditions when such an unusually large demand for heat is made that the temperature of the furnace tends to drop quickly below a predetermined temperature.

A still further object of my invention is to provide a system of the above-indicated character that shall be simple and rugged in its construction and connections and automatic and reliable in its operation.

In practicing my invention, I provide means for connecting a heater element or a plurality of heater elements of an electric furnace to a source of energy to effect the development of different amounts of heat thereby. When the operation of the furnace is to be initiated, the heater elements are connected to an electric circuit to develop a relatively large amount of heat until a predetermined temperature is attained. The heaters are thereupon connected to the circuit in a different manner to develop a smaller amount of heat so long as the temperature of the furnace is maintained within predetermined limits.

If a large load is put upon the furnace, tending to reduce the temperature below the range within which the low heat-developing connection of the heater element is employed, the connection is immediately changed to re-effect the development of the larger amount of heat to quickly cause the temperature to return to the predetermined range within which it is desired to be maintained.

The single figure of the accompanying drawing is a diagrammatic view of an electrical circuit, illustrating the control system embodying my invention.

A plurality of heater elements 1 of an electric furnace derive energy from an electrical circuit 2 through two switches 3 and 4 and a plurality of transformers 5. The operation of the switches is controlled by two motor-operated switches 6 and 7 that are respectively controlled by two thermostats 8 and 9. A manually-operated switch 10 controls the circuit whereby the controlling devices are rendered operative. An overload relay 11 is provided to protect the electric circuit 2 from faults occurring within the transformer 5 or upon the conductors connecting the transformer to the circuit.

The switch 3 comprises a plurality of main switches 12, an operating coil 13 and an auxiliary switch 14 that is normally closed when the switch 3 is open and open when the switch 3 is closed. The switch 4 similarly comprises a plurality of main switches 15, an operating coil 16 and an auxiliary switch 17.

The motor-operated snap switch 6 comprises a relatively high-speed rotatable motor 18 and a snap switch controlled thereby comprising a bridging member 19 and two sets of contact members 20 and 21.

The motor-operated snap switch 7 similarly comprises a motor 22 and a snap switch comprising a bridging member 23 and two sets of contact members 24 and 25.

The thermostat 8 comprises a plurality of stationary contact members 26 and 27 and a thermal-responsive element 28 that engages the contact member 26 while the temperature of the furnace is below a predetermined value and that engages the contact member 27 when the temperature attains, or exceeds, a different predetermined value. This thermostat is designated as a low-temperature thermostat.

The thermostat 9 similarly comprises two contact members 29 and 30 and a thermal-responsive member 31. This thermostat is designated as a high-temperature thermostat and is operative to maintain the temperature within the range determined by the relative position of the contact members 29 and 30.

It is obvious, of course, that the thermostats shown schematically in the accompanying drawing may be provided with means for varying the range within which the temperature of the furnace is to be controlled.

The overload relay 11 comprises a main switch 32 that is connected in series with the switch 10 to control the circuit of the control apparatus. The relay 11 further comprises an operating coil 33 and a pivoted switch control member 34 that is actuated against the force of a spring 35. The coil 33, when energized to a predetermined degree, actuates the pivoted member 34 to such position that it is engaged by a latching member 36 and maintained in such position to maintain the switch 32 open. The latching member 36 is maintained in its operative position by a spring 37 and may be actuated to release the switch-controlling member 34 by a resetting coil 38, the circuit of which may be controlled by a push-button switch 39.

When the operation of the furnace is desired, the switch 10 is closed, whereupon a circuit is completed from the conductor 40 of the circuit 2 through switch 32, switch 10, conductor 50, switch 17, coil 13, and the contact members 20 of the snap switch 6 to the conductor 41 of the main circuit 2. The coil 13 is thereupon energized to close the main switch contact members 12 of the switch 3 to connect the transformers 5 to the main circuit 2.

Had the snap switch 6 been in such position as to bridge the contact members 21 when the switch 10 was closed, a circuit would have been completed through the motor 18, the thermostat 8 and the switch contact members 21 to effect the energization of the motor 18 and the consequent actuation of the switch 6 to the position at which the contact members 20 are bridged, as illustrated in the drawing.

Had the contact members 25 of the switch 7 and the conductors 21 of the switch 6 been bridged when the switch 10 was closed, a circuit would have been completed through the operating coil of the switch 4, but the immediate actuation of the motor-operated snap switch 6 to its other position, as described in the previous paragraph, would have prevented the closing of the switch 4. Had the contact members 24 of the snap switch 7 been bridged when the switch 10 was closed, the circuit completed thereby through the motor 22 would have energized the motor to effect the actuation of the snap switch 7 to the position which is illustrated in the drawing at which the contact members 25 are bridged.

The switch 3, therefore, is the first to close after the main control switch 10 is closed. When the temperature of the furnace attains a predetermined value at which the thermal responsive member 28, of the thermostat 8 engages the bridging member 27, the circuit of the motor 18 is completed to effect the actuation of the snap switch 6 to open the circuit between the contact members 20 and to bridge the contact members 21. Since the circuit that is open between the contact members 20 includes the operating coil 13, the switch 3 is opened and the transformers 5 disconnected from the circuit 2.

Since the thermostat 9 is still in its cold position, the actuation of the snap switch 6 to bridge the contact members 21 serves to complete the circuit from the conductor 41 through a conductor 51, the contact members 21 of switch 6, the operating coil 16 of the switch 4, the auxiliary switch 14 of the switch 3, conductor 52, contact members 25 of the snap switch 7 and the switches 10 and 32 to the conductor 40. The main contacts of the switch 4 are thereupon closed to connect the potential taps of the transformer 5 to the circuit 2.

The temperature of the furnace is now to be maintained within the limits that are determined by the relative positions of the contact members 29 and 30. If the removal of heat from the furnace should be less than the amount of heat developed by the heater element 1, the temperature of the furnace would then increase to the maximum temperature determined by the position of the contact member 30 and, upon the engagement of the contact member 30 by the thermal-responsive member 31, the circuit of the motor 22 would be completed and the snap switch consequently actuated to its other position to bridge the contact members 24.

The opening of the circuit between the contact members 25 serves to de-energize the operating coil of the switch 4, whereupon the switch opens to disconnect the transformers 5 and, consequently, the heater elements 1 from the energizing circuit 2. Since no heat is now developed by the heaters 1, the temperature of the furnace decreases and when the temperature decreases to the value corresponding to the position of the contact member 29, the circuit of the motor 22 is again completed through the snap switch 7 in the position bridging the contact members 24, and the switch is again actuated to bridge the contact members 25 to again complete the circuit of the operating coil 16 of the switch 4. The temperature of the furnace 1 is then maintained between the limits determined by the relative positions of the contact members 29 and 30 while the removal of heat from the furnace is normal.

However, should an extra load be thrown on the furnace, that would cause the temperature thereof to decrease to a value below the value corresponding to the position of the contact member 29 and down to a value corresponding to the cold position of the thermostat 8, as determined by the position of the contact member 26, the circuit of the operating coil 16 would be opened and the circuit of the operating coil 13 would be completed, upon the engagement of the thermal-responsive member 28 with the cold-position contact member 26 of the thermostat 8. The switch 3 would thereupon be closed to connect the transformers 5 to the circuit 2 to effect the development of a large amount of heat in the furnace to quickly return the temperature thereof to the predetermined range within the limits controlled by the thermostat 9.

If abnormal conditions should occur within the transformers or the resistor 1 or upon the conductors between the main circuit 2 and the furnace, the overload relay 11 would operate to disconnect the control apparatus from the circuit and, consequently, the furnace also. The resetting of the overload relay would then be effected by means of the control switch 39.

It will be observed that, by means of the two switches 10 and 39, complete control of the starting and stopping of the operation of the furnace may be effected, and these switches may, therefore, be remotely disposed with respect to the furnace where so desired.

My invention is not limited to the specific structures illustrated or to the arrangement thereof, since modifications may be made therein within the spirit and scope of my invention, as set forth in the appended claims.

I claim as my invention:

1. A control system for an electric furnace, provided with a heater element adapted to be connected to an electric circuit to develop two degrees of heating, which comprises two circuits, each of which contains the operating coil of a main switch for connecting the heater element to the circuit, a selector switch at each end of the two circuits and a thermostat for controlling each selector switch.

2. A control system for an electric furnace, provided with a heater element adapted to be connected to an electric circuit to develop two degrees of heating, which comprises two circuits, each of which contains the operating coil of a main switch for connecting the heater element to the circuit, an electrically-operated selector switch at each end of the two circuits and temperature-responsive means for controlling the operation of each selector switch.

3. A control system for an electric furnace, provided with a heater element adapted to be connected to an electric circuit to develop two degrees of heating, which comprises two circuits, each of which contains the operating coil of a main switch for connecting the heater element to the circuit, electrically-operated means for controlling the energization of the two circuits and temperature-responsive means for controlling the electrically-operated means.

4. A control system for an electric furnace, provided with a heater element adapted to be connected to an electric circuit to develop two degrees of heating, which comprises two circuits, each of which contains the operating coil of a main switch for connecting the heater element to the circuit, a motor-operated snap switch at each end of the two circuits for controlling the connection thereof to a source of electromotive force and a thermostat associated with each snap switch to control the circuit of the motor.

5. A control system for an electric furnace, provided with a heater element adapted to be connected to an electric circuit to develop two degrees of heating, which comprises two circuits, each of which contains the operating coil of a main switch for connecting the heater element to the circuit and thermally-controlled electro-magnetic means for selectively controlling the energization of the two circuits.

6. In an electric furnace, the combination with a heater element thereof and a source of energy for the heater element, of means responsive to one predetermined range of temperature for effecting the development of a relatively large amount of heat by the resistor and means responsive to another range of temperature for effecting the development of a relatively small amount of heat.

7. In an electric furnace, the combination with a heater element thereof and a source of energy for the heater element, of thermo-responsive means for connecting the resistor to the source of energy to develop a relatively large amount of heat while the temperature of the furnace is below a predetermined value and thermo-responsive means for connecting the resistor to the source of energy to develop a smaller amount of energy while the temperature of the furnace exceeds a predetermined value.

8. In an electric furnace, the combination with a heater element thereof and a source of energy for the heater element, of thermoresponsive means for controlling the connection of the heater element to the source of energy to develop one amount of heat while the temprature of the furnace is within one predetermined range of temperature and to develop a different amount of heat while the temperature of the furnace is within a second range of temperature.

9. In an electric furnace, the combination with a heater element thereof and a source of energy for the heater element, of thermoresponsive means for controlling the connection of the heater element to the source of energy to develop one amount of heat while the temperature of the furnace is within one predetermined range of temperature and means for controlling the connection of the resistor to the source of energy to develop a different amount of heat while the temperature of the furnace is within a second range of temperature.

In testimony whereof, I have hereunto subscribed my name this 31st day of March, 1922.

WALTER C. DIXON.